UNITED STATES PATENT OFFICE 2,426,417

ESTERS OF HYDROXYPHENYL TRICHLOROMETHYL CARBINOLS

Norman E. Searle, Wilmington, Del., assignor to E. I. du Pont de Nemours & Company, Wilmington, Del., a corporation of Delaware No Drawing. Application February 26, 1946, Serial No. 650,377

9 Claims. (Cl. 167—30)

This invention relates to insecticidal compositions and methods which utilize as an essential active ingredient an ether of a hydroxyphenyl trichloromethyl carbinol represented by the formula (1)
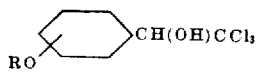

where R, linked to the oxygen by carbon, represents a monovalent organic radical in which the sum of the atomic weights is less than 200.

The invention has as an object the provision of compositions for the control of insects. It is a further object to provide household insect spray compositions which give rapid knockdown and kill of flies. A still further object is to provide methods for killing insects. Other objects will be disclosed hereinafter.

According to the present invention the foregoing and other objects are attained by admixing the trichloromethyl carbinols of the invention with an insecticidal adjuvant and by effecting contact of the insects with a toxic amount of the compounds.

The trichloromethyl carbinols employed in the compositions and methods of the present invention may be prepared by the reaction of chloral with an equimolecular proportion of an appropriate phenyl ether using an acid-type catalyst such as aluminum chloride, sulfuric acid, and boron trifluoride.

(2)
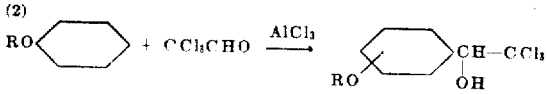

Alternatively, these carbinols may be prepared by the reaction of chloroform with an appropriate ether derivative of a hydroxybenzaldehyde in the presence of an alkaline catalyst.

(3)
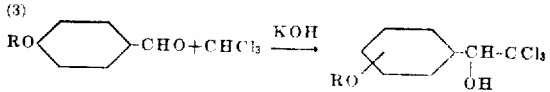

Typical of the radicals represented by R in Formula 1 and in the formulas of Equations 2 and 3 are hydrocarbon radicals such as methyl, ethyl, propyl, isopropyl, allyl, methallyl, butyl, amyl, hexyl, octyl, decyl, dodecyl, phenyl, benzyl, tolyl, cyclohexyl, naphthyl; and ether interrupted hydrocarbon radicals such as methoxyethyl, butoxyethyl, and phenoxypropyl.

The trichloromethyl carbinols of the type defined by Formula 1 have been found particularly effective in suitable compositions with insecticidal adjuvants for the control of a wide variety of insects. Compositions of the invention, including solutions of the compounds in a hydrocarbon, such as deodorized kerosene commonly used in the art as a fly spray base, have been found to have outstanding paralyzing action against flies and can, therefore, be utilized as substitutes for the pyrethrum-petroleum distillate compositions which have heretofore been the principal fly paralytic compositions.

By the term "insect" I mean to include those small invertebrate animals belonging mostly to the class insecta comprising six-legged, usually winged forms, such as beetles, bugs, bees, and flies; and also other allied classes of arthropods whose members are wingless and usually have more than six legs, such as spiders, mites, ticks, centipedes, and wood lice.

By the term "insecticidal adjuvant" I mean a substance which is capable of presenting or aiding in the presentation of an insect toxicant to an insect. The term "adjuvant" is well established in the art where it is recognized that an active agent or toxicant is in itself of little practical utility for combatting insects unless it be presented in a form suitable for effecting intimate contact of the agent or its vapors, as the particular case may require, with the insect. Thus additional material or materials are employed in the formulation of an active agent to yield a suitable insecticidal composition, such materials being adjuvants.

Those conversant with the art know the adjuvants which may be combined with a suitable toxicant or combination of toxicants to yield a composition suited to the control of a particular insect or combination of insects, having in mind the nature of the insect, its particular habitat and feeding habits, and its peculiar susceptibilities, if any. I have found that insecticidal adjuvants and toxicants can be combined similarly in various formulations with the carbinols of this invention to yield effective insecticidal compositions.

Preferably the compounds of the invention are formulated with appropriate insecticidal adjuvants in the form of solutions of a suitable solvent, dust compositions, or slurries or emulsions in water according to the requirements of control of the particular pest involved.

Where a solution of the active agent in a solvent is desired such as for use in a fly spray composition, the adjuvant may be a hydrocarbon and is preferably a refined kerosene of the type known in the art as a fly spray base solvent. Alternatively, solvents such as trichloroethylene, tetrachloroethylene, toluene, xylene, cyclohexanone, acetone, and alkylated naphthalene may be used, but these solvents do not possess the economic and other practical advantages of refined kerosene. Such alternative solvents have their principal use as booster solvents, that is, they are added to kerosene base fly spray compositions to aid in dissolving the active ingredient in the liquid vehicle. The carbinols used in the compositions of this invention, however, are for the most part readily soluble in kerosene to the concentrations required for fly sprays.

The adjuvant employed when a dust composition is desirable is preferably selected from the class of finely divided solids comprising talcs, pyrophyllite, natural clays and diatomaceous earth, such materials having a frequency particle size of less than 50 microns. Other adjuvants which may be used in dust compositions include such finely divided powders as calcium phosphate, calcium carbonate, magnesium carbonate, sulfur, lime, and flours such as walnut shell, wheat, redwood, soya bean, and cottonseed.

An insectidal composition for use as a slurry dispersed in water is produced preferably in the form of a powder containing one of the adjuvants common to the dust compositions described above, said powder then being dispersed for actual usage in the water usually with the aid of an adjuvant such as a wetting, dispersing, or emulsifying agent. Typical of the adjuvants of this type are materials such as the sulfated higher alcohols, polyvinyl alcohols, polyethylene oxides, the alkali metal or amine salts of oleic acid, the sulfonated animal and vegetable oils such as sulfonated fish and castor oils, the sulfonated petroleum oils, alkali metal salts of alkylnaphthalene sulfonic acids, and such proprietary preparations as are listed in detail in Bulletin E-607 of the Bureau of Entomology and Plant Quarantine of the U. S. Dept. of Agriculture.

If the insecticidal composition is desired in the form of a liquid to be used as a dispersion or emulsion in water, then it is preferred to prepare a relatively concentrated composition of the active agent dissolved in a suitable solvent selected according to the use to which it is to be put or to prepare an emulsion of the active agent in a nonsolvent in certain cases where such technique is more applicable, said solution or emulsion subsequently being dispersed in water to permit suitable application. In essentially all compositions prepared for ultimate use as emulsions in water, the essential adjuvant is a wetting, dispersing, or emulsifying agent, such as have been detailed above.

The compositions of the invention may include other insect toxicants such as metallic arsenates, fluosilicates, phenothiazines, hexachlorocyclohexanes, 2,2-bis(para-chlorophenyl)-1,1,1-trichloroethane, 2,2-bis(para-methoxyphenyl)-1,1,1-trichloroethane, organic thiocyanates such as n-dodecyl thiocyanate, fenchyl thiocyanoacetate and butyl carbitol thiocyanate, nicotine, anabasine (neo-nicotine), nor-nicotine, rotenone and its congeners, sabadilla, ryania, hellebore, pyrethrum, N-isobutylundecylenamide, and aminomethyl sulfides.

The compositions may also contain bactericides and fungicides, such as sulfur, polysulfides such as lime-sulfur, the chlorinated phenols, aminomethyl sulfides, copper acylacetonates, copper chelates of beta-keto acids and esters, copper chelates of salicylaldehyde, Burgundy mixture, Bordeaux mixture, the so-called insoluble coppers such as basic copper sulfates, copper oxychlorides, copper calcium chlorides, copper oxides, copper silicates, copper zeolites, and copper thiocyanates, the long-chain quaternary ammonium halides and metallic derivatives of dithiocarbamic acid such as ferric dimethyldithiocarbomate.

Compositions containing the carbinols of the invention and insecticides and fungicides and insecticidal and fungicidal adjuvants as have been set out may have particular usefulness as special applications and frequently will give better results than would be anticipated from the killing power and repellent action of each ingredient when used alone.

In general, suitable compositions may be prepared with the toxicants of the invention in a state of composition, subdivision and association with other materials, such as have been mentioned, such as may be necessary peculiarly to adapt the toxicants to the purpose to be effected.

The concentration of insect toxicant necessary to effect kill of the insect varies over a wide range because of the difference in susceptibility of different insects to the material and the effect of the particular type of adjuvant employed and the effect of various modifying agents such as have been fully disclosed. In general, application of insecticidal compositions containing 0.1 to 25 per cent of a trichloromethyl carbinol of the invention may be utilized satisfactorily.

The invention may be more fully understood by reference to the following examples.

*Example 1*

A liquid spray composition was prepared by dissolving 2 parts by weight of the oily, liquid compound, ethoxyphenyl trichloromethyl carbinol (B. P. 158–159° C./2 mm.) in 98 parts by weight of Deo-Base, a proprietary fly spray base oil of the refined kerosene type. The composition thus obtained was sprayed in a room infested with flies and within a minute after spraying the flies began to drop to the floor. After 10 minutes, all the flies had dropped and none of them recovered.

*Example 2*

Five (5) parts by weight of the liquid methoxyphenyl trichloromethyl carbinol (B. P. 162–164° C./6 mm.) is added to 47.5 parts by weight of finely ground fuller's earth with mixing and this mixture is then blended with 47.5 parts by weight of powdered talc. There is obtained a free-flowing dust ready for use for the control of such insects as aphid and red spider by direct application to an area to be protected. It may be used indoors, such as in the house or barn, and may also be applied in the garden.

*Example 3*

Ethoxyphenyl trichloromethyl carbinol (20 parts by weight) was added to 39.5 parts by weight of precipitated tricalcium phosphate with mixing and the mixture blended with 39.5 parts by weight of pyrophyllite and 1 per cent goulac. There results a useful composition for the control of insects on or around vegetation. It may be applied as a dust or, alternatively, it may be readily dispersed in water and sprayed as an aqueous slurry over the area to be protected.

I claim:

1. An insecticidal composition containing as an essential active ingredient in admixture with an insecticidal adjuvant a compound represented by the formula

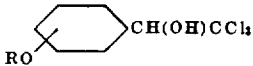

where R, linked to the oxygen by carbon, represents a monovalent organic radical in which the sum of the atomic weights is less than 200.

2. An insecticidal composition containing in solution in a hydrocarbon a compound represented by the formula

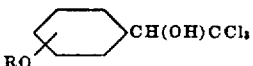

where R, linked to the oxygen by carbon, represents a monovalent organic radical in which the sum of the atomic weights is less than 200.

3. An insecticidal composition containing as an essential active ingredient in admixture with a talc having a frequency particle size of less than 50 microns a compound represented by the formula

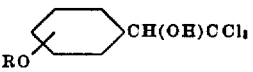

where R, linked to the oxygen by carbon, represents a monovalent organic radical in which the sum of the atomic weights is less than 200.

4. An insecticidal composition containing as an essential active ingredient in admixture with a sulfated higher alcohol a compound represented by the formula

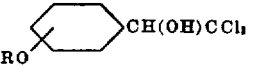

where R, linked to the oxygen by carbon, represents a monovalent organic radical in which the sum of the atomic weights is less than 200.

5. An insecticidal composition containing as an essential active ingredient in admixture with an insecticidal adjuvant a compound represented by the formula $$RO-\bigcirc-CH(OH)CCl_3$$

where R, linked to the oxygen by carbon, represents a monovalent hydrocarbon radical in which the sum of the atomic weights is less than 200.

6. An insecticidal composition containing as an essential active ingredient para-ethoxyphenyl trichloromethyl carbinol.

7. The method of insect control which comprises effecting contact of the insect with a compound represented by the formula $$RO-\bigcirc-CH(OH)CCl_3$$

where R, linked to the oxygen by carbon, represents a monovalent organic radical in which the sum of the atomic weights is less than 200.

8. The method of insect control which comprises effecting contact of the insect with a compound represented by the formula $$RO-\bigcirc-CH(OH)CCl_3$$

where R, linked to the oxygen by carbon, represents a monovalent hydrocarbon radical in which the sum of the atomic weights is less than 200.

9. The method of insect control which comprises effecting contact of the insect with para-ethoxyphenyl trichloromethyl carbinol.

NORMAN E. SEARLE.

Certificate of Correction

Patent No. 2,426,417. August 26, 1947.

NORMAN E. SEARLE

It is hereby certified that errors appear in the above numbered patent requiring correction as follows: In the grant, line 6, and in the heading to the printed specification, line 2, first word of the title of invention, for "ESTERS" read *ETHERS*; and that the said Letters Patent should be read with these corrections therein that the same may conform to the record of the case in the Patent Office.

Signed and sealed this 16th day of December, A. D. 1947.

[SEAL]

THOMAS F. MURPHY,
*Assistant Commissioner of Patents.* insecticidal adjuvant a compound represented by the formula

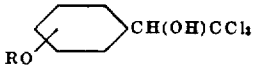

where R, linked to the oxygen by carbon, represents a monovalent organic radical in which the sum of the atomic weights is less than 200.

2. An insecticidal composition containing in solution in a hydrocarbon a compound represented by the formula

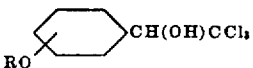

where R, linked to the oxygen by carbon, represents a monovalent organic radical in which the sum of the atomic weights is less than 200.

3. An insecticidal composition containing as an essential active ingredient in admixture with a talc having a frequency particle size of less than 50 microns a compound represented by the formula

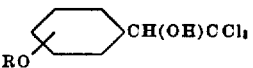

where R, linked to the oxygen by carbon, represents a monovalent organic radical in which the sum of the atomic weights is less than 200.

4. An insecticidal composition containing as an essential active ingredient in admixture with a sulfated higher alcohol a compound represented by the formula

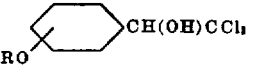

where R, linked to the oxygen by carbon, represents a monovalent organic radical in which the sum of the atomic weights is less than 200.

5. An insecticidal composition containing as an essential active ingredient in admixture with an insecticidal adjuvant a compound represented by the formula $$RO\text{-}C_6H_4\text{-}CH(OH)CCl_3$$

where R, linked to the oxygen by carbon, represents a monovalent hydrocarbon radical in which the sum of the atomic weights is less than 200.

6. An insecticidal composition containing as an essential active ingredient para-ethoxyphenyl trichloromethyl carbinol.

7. The method of insect control which comprises effecting contact of the insect with a compound represented by the formula $$RO\text{-}C_6H_4\text{-}CH(OH)CCl_3$$

where R, linked to the oxygen by carbon, represents a monovalent organic radical in which the sum of the atomic weights is less than 200.

8. The method of insect control which comprises effecting contact of the insect with a compound represented by the formula $$RO\text{-}C_6H_4\text{-}CH(OH)CCl_3$$

where R, linked to the oxygen by carbon, represents a monovalent hydrocarbon radical in which the sum of the atomic weights is less than 200.

9. The method of insect control which comprises effecting contact of the insect with para-ethoxyphenyl trichloromethyl carbinol.

NORMAN E. SEARLE.

Certificate of Correction

Patent No. 2,426,417.                                     August 26, 1947.

NORMAN E. SEARLE

It is hereby certified that errors appear in the above numbered patent requiring correction as follows: In the grant, line 6, and in the heading to the printed specification, line 2, first word of the title of invention, for "ESTERS" read *ETHERS*; and that the said Letters Patent should be read with these corrections therein that the same may conform to the record of the case in the Patent Office.

Signed and sealed this 16th day of December, A. D. 1947.

[SEAL]

THOMAS F. MURPHY,
*Assistant Commissioner of Patents.*